United States Patent [19]

Bedwell et al.

[11] Patent Number: 5,102,917
[45] Date of Patent: Apr. 7, 1992

[54] POROUS POLYSULFONE MEDIA SUITABLE FOR FILTRATION

[75] Inventors: William B. Bedwell, Chicago; Stephen F. Yates, Arlington Heights, both of Ill.

[73] Assignee: CPC Engineering Corporation, Sturbridge, Mass.

[21] Appl. No.: 586,102

[22] Filed: Sep. 14, 1990

[51] Int. Cl.$^5$ .......................... C08J 9/26; B29C 65/00
[52] U.S. Cl. ....................................... 521/61; 264/41; 521/62; 521/63
[58] Field of Search ................ 521/61, 62, 63; 264/41

[56] References Cited

U.S. PATENT DOCUMENTS

| | | | |
|---|---|---|---|
| 2,504,208 | 4/1950 | Locke et al. | 521/61 |
| 2,554,485 | 5/1951 | Wilson | 521/61 |
| 2,676,929 | 4/1954 | Duddy | 521/61 |
| 2,984,869 | 5/1961 | Honey et al. | 521/61 |
| 3,062,760 | 11/1962 | Dermody et al. | 521/62 |
| 3,310,505 | 3/1963 | Parker | 521/62 |
| 3,375,208 | 3/1968 | Duddy | 521/61 |
| 3,518,332 | 6/1970 | Sklarchuk et al. | 521/61 |
| 3,536,796 | 10/1970 | Rock | 521/61 |
| 3,682,848 | 8/1972 | Virnelson | |
| 3,763,055 | 10/1973 | White et al. | 521/64 |
| 4,096,099 | 6/1978 | Koyama et al. | |
| 4,163,725 | 8/1979 | Sano et al. | 521/61 |
| 4,237,083 | 12/1980 | Young et al. | |
| 4,351,860 | 9/1982 | Yoshida et al. | 264/41 |
| 4,612,119 | 9/1986 | Eguchi | 210/500.23 |
| 4,705,809 | 11/1987 | Dighton et al. | 521/62 |
| 4,806,291 | 2/1989 | Susa | 521/61 |
| 4,868,222 | 9/1989 | Chau et al. | 521/61 |

*Primary Examiner*—Morton Foelak
*Attorney, Agent, or Firm*—Finnegan, Henderson, Farabow, Garrett & Dunner

[57] ABSTRACT

A porous polysulfone membrane and process for the preparation of porous polysulfone media suitable for use in filtration comprises blending polysulfone with a particulate solid or with said particulate solid and a second polymer, extruding the resultant blend to form an article and leaching the particulate solid and second polymer from the article.

19 Claims, No Drawings

POROUS POLYSULFONE MEDIA SUITABLE FOR FILTRATION

This application is related to co-pending application Ser. No. 582,162 filed Sept. 14, 1990, entitled COMPOSITION AND METHOD FOR CLEANING POROUS MEMBRANES.

FIELD OF THE INVENTION

The present invention relates to a process for the preparation of porous polysulfone media suitable for use in filtration.

BACKGROUND OF THE INVENTION

The general process for making a porous polymer by mixing the polymer with a second polymer or a second type of material which can be leached from the mixture is known in the art as exemplified by U.S. Pat. No. 2,504,208; which discloses the general concept of making a porous polymer by mixing soluble and insoluble polymers and then leaching the soluble polymer from the mixture to form a porous product (Col. 1, lines 28–40).

U.S. Pat. No. 3,062,760 discloses a process for making a porous polymer comprising mixing a polymer with a pore forming material, extruding the mixture into a shape and removing the pore forming material by leaching. Of particular interest is the disclosure of the use of calcium carbonate as a suitable pore forming agent and the teaching that such a pore forming agent can be removed from the polymerized resin by a leaching agent such as an acid (Col. 2, lines 5–23).

U.S Pat. No. 3,310,505 discloses a method for making a porous polymer wherein a mixture of polymers is subjected to leaching to remove one of the polymers from the mixture.

U.S. Pat. Nos. 3,682,848, 3,763,055, 4,705,809, 4,096,099, and 4,237,083 disclose porous polymers for use as filters and microporous membranes.

U.S. Pat. No. 4,351,860 discloses a polyaryl ether sulfone semipermeable membrane and a process for producing the same. A polyaryl ether sulfone is dissolved in a mixed solution of electrolyte and solvents to form a dope of the polyaryl ether sulfone which is extruded to obtain a film or fiber. Both sides of the fiber or film are contacted with a liquid miscible with the mixed solvent but incapable of dissolving the polyaryl ether sulfone so as to remove substantially all of the mixed solvent from the fiber or film to obtain a porous membrane.

U.S. Pat. No. 4,163,725 discloses a method for the preparation of a semipermeable membrane involving polysulfones. Porous membranes of polysulfone are prepared by dissolving polysulfone in a solvent. The polymer solution is cast on a substrate and the solvent is evaporated for a period of time. The substrate is then dipped in a non-solvent.

U.S. Pat. No. 4,612,119 discloses a process for preparing a hollow fiber filter medium by dissolving a polysulfone in a solvent to form a solvent solution, extruding the solvent solution and bringing the extrudate into contact with an outside coagulating liquid. The transition temperature of the solution is within the range of 30° to 150° C., which corresponds to the range of 86° F to 302° F.

It is an object of the present invention to provide an improved material for water filtration, and for an improved process for obtaining said material.

SUMMARY OF THE INVENTION

The present invention fulfills the above object and is directed to a process for the preparation of porous polysulfone media suitable for use in filtration by blending polysulfone with a particulate solid or with said particulate solid and a second polymer, and to a porous polysulfone membrane prepared by said process.

Polysulfones are thermoplastic resins which are easy to be molded and possess excellent chemical, mechanical and thermal properties.

The applicants have discovered that polysulfone is a highly desirable material for water filtration. In contrast to the nylon 11 co-polymer currently used, polysulfone shows little fouling by humic acids, is easily cleaned, and shows high resistance to degradation by cleaning chemicals like mineral acids or oxidants. The present invention discloses a process for preparing porous polysulfone filtration media for use in water filtration.

Preparation involves blending polysulfone with a particulate solid or with said particulate solid and a second polymer which is (1) thermally stable, (2) soluble in a solvent in which polysulfone is insoluble, and (3) incompatible with polysulfone at room temperature through the melt temperature. The amount of polysulfone is not lower than 10%. When the second polymer is used, a blend is prepared by mixing the two polymers and the particulate solid together, preferably as powders, and heating to above the glass transition temperature of both polymers. The resultant blend is a continuous phase. The amount of the particulate solid ranges from about 30 to 85% by weight. The amount of the polysulfone and the second polymer ranges from about 10 to 35% and 0 to 40% by weight respectively. The blending may be conducted in the absence of a solvent. The blend is then extruded, dried and cut into small pieces or pellets. The pieces are fed into a melt extruder, formed into a desired shape (such as hollow tubes or flat sheets), and cooled. The extrudates are soaked in a solvent in which polysulfone is insoluble to leach the soluble polymer and particulate solid from the filter, thereby leaving pores. The solvent may be water, an acid such as hydrochloric or any liquid in which polysulfone is insoluble. In one embodiment, the particulate solid is leached with a solvent after the second polymer has been removed. The leached tubes or sheets preferably have a void fraction of 65–75%.

When the second polymer is not used, the polysulfone is blended with the particulate solid and the preparation is in accordance with the above description.

When a second polymer is used, the choice of the second polymer is important since finding two miscible polymers is rare. Applicants have found that polyethylene oxide or polyvinylpyridine can be blended in a 1:1 ratio with polysulfone at 350° C. to form a hard non-crumbling solid. Mixtures of polyethylene oxide and polyvinylpyridine may also be used with the polysulfone. This solid can be leached with water or dilute hydrochloric acid to provide a porous polysulfone media. The pore size and total porosity are controlled by varying the ratio and molecular weights of the two polymers, the temperature and the degree of mixing. Additives include surfactants, plasticizers and antioxidants.

Polymers less polar then polysulfone could be used and then leached by a hydrocarbon solvent in which the polysulfone polymer is insoluble.

DESCRIPTION OF THE PREFERRED EMBODIMENTS

Polysulfone and polyethylene oxide were extruded together in a one inch melt extruder. The initial characteristic extrudate was produced from 30% to 70% polyethylene oxide with the remainder being polysulfone. Two different molecular weights of polysulfone (Amoco Udel P-1700 and P-3500) and four molecular weights of polyethylene oxide (Union Carbide Polyox WSR-301, WSR-205, WRPA-3154, WSR-N10) were used. The extrusions were conducted at temperatures between 400° F. and 650° F. The resulting products did not have the desired mechanical strength.

It was surprisingly found when 53% $CaCO_3$ solids were added to a 24% polysulfone, 23% polyethylene oxide blend a dramatic improvement occurred in the characteristics of the extrudate. The added solids produced an extrudate with greatly improved mechanical integrity, after leaching. The solid can be any fine powder having a size greater than fifty microns which is soluble in a leach solution which does not dissolve polysulfone. Inclusion of an inorganic solid in the polysulfone resin produces porous polymers with enhanced mechanical integrity even after leaching of the extrudate. When the inorganic solid is leached away by acid treatment, the mechanical integrity is preserved.

The following examples further illustrate preferred embodiments of the present invention. The examples should in no way be considered limiting, but are merely illustrative of the various features of the present invention. In the examples and throughout the specification and claims, all parts and percentages are by weight unless otherwise specified.

EXAMPLE 1

A blend of 24% polysulfone, 23% polyethylene oxide, and 53% calcium carbonate was extruded as a tube from a one-inch melt extruder with a melt temperature in the range of 490° to 530° F. After leaching with hydrochloric acid and then several times with water, microporous tubing was obtained. The porosity was approximately 70%. An average pore diameter of 1 to 2 microns was observed with mercury intrusion porosimetry.

EXAMPLE 2

A blend of 33% polysulfone, 33% polyvinylpyridine, and 33% calcium carbonate was extruded as a tube from a one-inch melt extruder with a melt temperature in the range of 490° to 530° F. After leaching with hydrochloric acid and then several times with water, microporous tubing was obtained. The porosity was approximately 70%. An average pore diameter of 1 to 2 microns was observed with mercury intrusion porosimetry.

What is claimed is:

1. A process for the preparation of porous polysulfone media suitable for use in filtration comprising:

blending a polysulfone polymer with an inorganic solid or with said inorganic solid and a second polymer selected from the group consisting of polyethylene oxide, polyvinylpyridine and a mixture thereof;

extruding the resultant blend to form an article of a desired shape; and removing the second polymer and the inorganic solid from the article to form the porous polysulfone media.

2. The process of claim 1, wherein the extrudate is produced with from 30% to 70% polyethylene oxide with the remainder being polysulfone or polysulfone and the inorganic solid.

3. The process of claim 1, wherein the blending is conducted in the absence of a solvent.

4. The process of claim 1, wherein the blend contains said inorganic solid and said second polymer and wherein the blending is conducted at a temperature above the glass transition temperature of said polymers.

5. The process of claim 4, wherein the polysulfone polymer is present in an amount not lower than 10% by weight.

6. The process of claim 4, wherein the second polymer is thermally stable, soluble in a solvent in which the polysulfone polymer is insoluble, and incompatible with the polysulfone polymer.

7. The process of claim 4, wherein the second polymer is less polar than the polysulfone polymer and is soluble in a hydrocarbon solvent in which the polysulfone polymer is insoluble.

8. The process of claim 1, wherein the inorganic solid is a finely divided powder that is soluble in a solvent in which the polysulfone polymer is insoluble.

9. The process of claim 8, wherein the powder has a particle size less than 50 microns in diameter.

10. The process of claim 1, wherein the inorganic solid is calcium carbonate.

11. The process of claim 1, wherein the blend is extruded at a temperature of from about 400°–700° F.

12. The process of claim 1, wherein the blend is comprised of about 15–35% polysulfone, about 0–40% polyethyleneoxide, and about 30–85% calcium carbonate by weight.

13. The process of claim 1, wherein the blend is comprised of about 24% polysulfone, about 23% polyethylene oxide and about 53% calcium carbonate by weight.

14. The process of claim 1, wherein the second polymer and the inorganic solid are removed by leaching.

15. The process of claim 14, wherein the second polymer is leached with a solvent in which the polysulfone polymer is insoluble.

16. The process of claim 15, wherein the solvent is water.

17. The process of claim 14, wherein the inorganic solid is leached with a solvent after the second polymer is removed.

18. The process of claim 17, wherein the solvent is an acid.

19. The process of claim 17, wherein the solvent is hydrochloric acid.

* * * * *